United States Patent
Yelton

(10) Patent No.: US 11,348,212 B2
(45) Date of Patent: *May 31, 2022

(54) AUGMENTED CONTRAST LIMITED ADAPTIVE HISTOGRAM EQUALIZATION

(71) Applicant: The Boeing Company, Chicago, IL (US)

(72) Inventor: Dennis Yelton, Chicago, IL (US)

(73) Assignee: The Boeing Company, Chicago, IL (US)

(*) Notice: Subject to any disclaimer, the term of this patent is extended or adjusted under 35 U.S.C. 154(b) by 391 days.

This patent is subject to a terminal disclaimer.

(21) Appl. No.: 16/536,496

(22) Filed: Aug. 9, 2019

(65) Prior Publication Data
US 2021/0042893 A1    Feb. 11, 2021

(51) Int. Cl.
G06T 5/40       (2006.01)
H04N 13/204   (2018.01)
(Continued)

(52) U.S. Cl.
CPC .......... *G06T 5/40* (2013.01); *B64D 39/00* (2013.01); *B64D 45/0005* (2013.01); *B64D 47/08* (2013.01); *G06T 5/003* (2013.01); *G06T 5/007* (2013.01); *G06T 5/20* (2013.01); *G06T 7/97* (2017.01); *H04N 13/204* (2018.05); *G06T 2207/10021* (2013.01)

(58) Field of Classification Search
CPC .... B64D 39/00; B64D 45/0005; B64D 47/08; G06T 5/009; G06T 5/40; G06T 5/003; G06T 5/007; G06T 5/20; G06T 7/97; G06T 2207/10021; G06T 2207/10032; G06T 5/004; H04N 13/239

USPC .......................................... 382/168–169, 174
See application file for complete search history.

(56) References Cited

U.S. PATENT DOCUMENTS 7,139,022 B1 * 11/2006 Raffy ................. H04N 9/04557
                                                        345/604
2001/0045988 A1 * 11/2001 Yamauchi ................. G06T 5/20
                                                        348/273

(Continued)

OTHER PUBLICATIONS

Maini, Raman, and Himanshu Aggarwal. "Study and Comparison of Various Image Edge Detection Techniques." International Journal of Image Processing (IJIP) 3.1: 1. (Year: 2009).*

(Continued)

*Primary Examiner* — Geoffrey E Summers
(74) *Attorney, Agent, or Firm* — McDonnell Boehnen Hulbert & Berghoff LLP

(57) ABSTRACT

The present disclosure relates to imaging systems, aerial refueling aircraft, and methods relating to the processing of images. An example imaging system includes at least one camera, a display, and a controller. The controller includes at least one processor and a memory. The controller is configured to carry out operations. The operations include receiving at least one image from the at least one camera. The operations additionally include adjusting the at least one image to provide at least one adjusted image. Adjusting the at least one image includes applying: a local adaptive histogram equalization filter, a global gamma correction filter, and a local contrast filter. The operations also include outputting the at least one adjusted image to the display.

20 Claims, 13 Drawing Sheets

(51) Int. Cl.
*G06T 5/20* (2006.01)
*G06T 5/00* (2006.01)
*G06T 7/00* (2017.01)
*B64D 39/00* (2006.01)
*B64D 47/08* (2006.01)
*B64D 45/00* (2006.01)

(56) References Cited

U.S. PATENT DOCUMENTS

| | | | | |
|---|---|---|---|---|
| 2004/0234151 | A1* | 11/2004 | Thal | G06T 5/008 382/254 |
| 2010/0066811 | A1* | 3/2010 | Chang | G06T 7/593 348/43 |
| 2010/0278423 | A1* | 11/2010 | Itoh | G06T 5/40 382/169 |
| 2010/0303310 | A1* | 12/2010 | Chiu | G06K 9/0008 382/124 |
| 2011/0147529 | A1* | 6/2011 | Adarve Lozano | B64D 39/00 244/135 A |
| 2017/0041543 | A1* | 2/2017 | Kikuchi | H04N 5/23258 |

OTHER PUBLICATIONS

Zuiderveld, Karel, "Constant Limited Adaptive Histogram Equalization," Graphics Gems IV, 1994, pp. 474-485 (Edited by Paul S. Heckbert) (Year: 1994).*

Phelippeau, Harold, et al. "Shot noise adaptive bilateral filter." 2008 9th International Conference on Signal Processing. IEEE, 2008. (Year: 2008).*

Ashiba, M. I., et al. "Gamma correction enhancement of infrared night vision images using histogram processing." Multimedia Tools and Applications 78.19 (2019): 27771-27783. (Year: 2019).*

Ferguson, Phillip David, et al. "Evaluation of contrast limited adaptive histogram equalization (CLAHE) enhancement on a FPGA." 2008 IEEE International SOC Conference. IEEE, 2008. (Year: 2008).*

Nercessian, Shahan C., Sos S. Agaian, and Karen A. Panetta. "A generalized set of kernels for edge and line detection." Image Processing: Algorithms and Systems VII. vol. 7245. International Society for Optics and Photonics, 2009. (Year: 2009).*

Szeliski, Richard. Computer vision: algorithms and applications. Springer Science & Business Media, 2010. (Year: 2010).*

Gonzalez, Rafael C. and Richard E. Woods. Digital Image Processing. 2008, Pearson, 3rd Ed. pp. 152-165. (Year: 2008).*

Smith, Steven W. The Scientist and Engineer's Guide to Digital Signal Processing. 1999, California Technical Publishing, 2nd Ed. ( Year: 1999).*

Tabora, Vincent. "Understanding Frame Rate In Video." 2019, Medium, https://medium.com/hd-pro/understanding-frame-rate-in-video-7adb1c3a7ea5 (Year: 2019).*

Zuiderveld, Karel, "Constant Limited Adaptive Histogram Equalization," Graphics Gems IV, 1994, pp. 474-485 (Edited by Paul S. Heckbert).

* cited by examiner

AUGMENTED CONTRAST LIMITED ADAPTIVE HISTOGRAM EQUALIZATION

FIELD

The present disclosure relates to systems and methods for enhancing video images, particularly in the context of aerial refueling (e.g., in-air tanker aircraft).

BACKGROUND

Aerial refueling can be performed by a tanker aircraft by way of a refueling boom. In some embodiments, the boom could include a plurality of flight control surfaces to move the fuel probe of the boom so as to mate with a fuel nozzle of a receiving aircraft.

A conventional solution is to define twenty image scenes that adjust the contrast based on image statistics taken over a wide portion of the overall image. For each scene, pre-defined maximum and minimum histogram limits over a third or more of the image are stretched to fill the entire dynamic range and then additional differential contrast stretching or compression is applied across the dynamic range globally over the entire image. Frequently, one or more of these twenty scenes provide good viewing results, but there are many cases where the contrast in the processed images is still too poor for aerial refueling operators (AROs) to conduct the refueling task.

SUMMARY

In an aspect, a method for processing images is described. The method includes receiving, at a controller, at least one image. The method also includes adjusting the at least one image, by the controller, to provide at least one adjusted image. Adjusting the at least one image includes applying: a local adaptive histogram equalization filter, a global gamma correction filter, and a local contrast filter.

In another aspect, an imaging system is described. The imaging system includes at least one camera and a display. The imaging system also includes a controller having at least one processor and a memory. The controller carries out operations that include receiving at least one image from the at least one camera and adjusting the at least one image to provide at least one adjusted image. Adjusting the at least one image includes applying: a local adaptive histogram equalization filter, a global gamma correction filter, and a local contrast filter. The operations also include outputting the at least one adjusted image to the display.

In another aspect, an aerial refueling aircraft is provided. The aerial refueling aircraft includes a display and a controller configured to provide image data to the display. The controller includes at least one processor and a memory. The controller carries out operations including receiving at least one image and adjusting the at least one image to provide at least one adjusted image. Adjusting the at least one image includes applying: a local adaptive histogram equalization filter, a global gamma correction filter, and a local contrast filter. The operations also include outputting the at least one adjusted image to the display.

Other aspects, examples, and implementations will become apparent to those of ordinary skill in the art by reading the following detailed description with reference, where appropriate, to the accompanying drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

I. Overview

Figure 1:
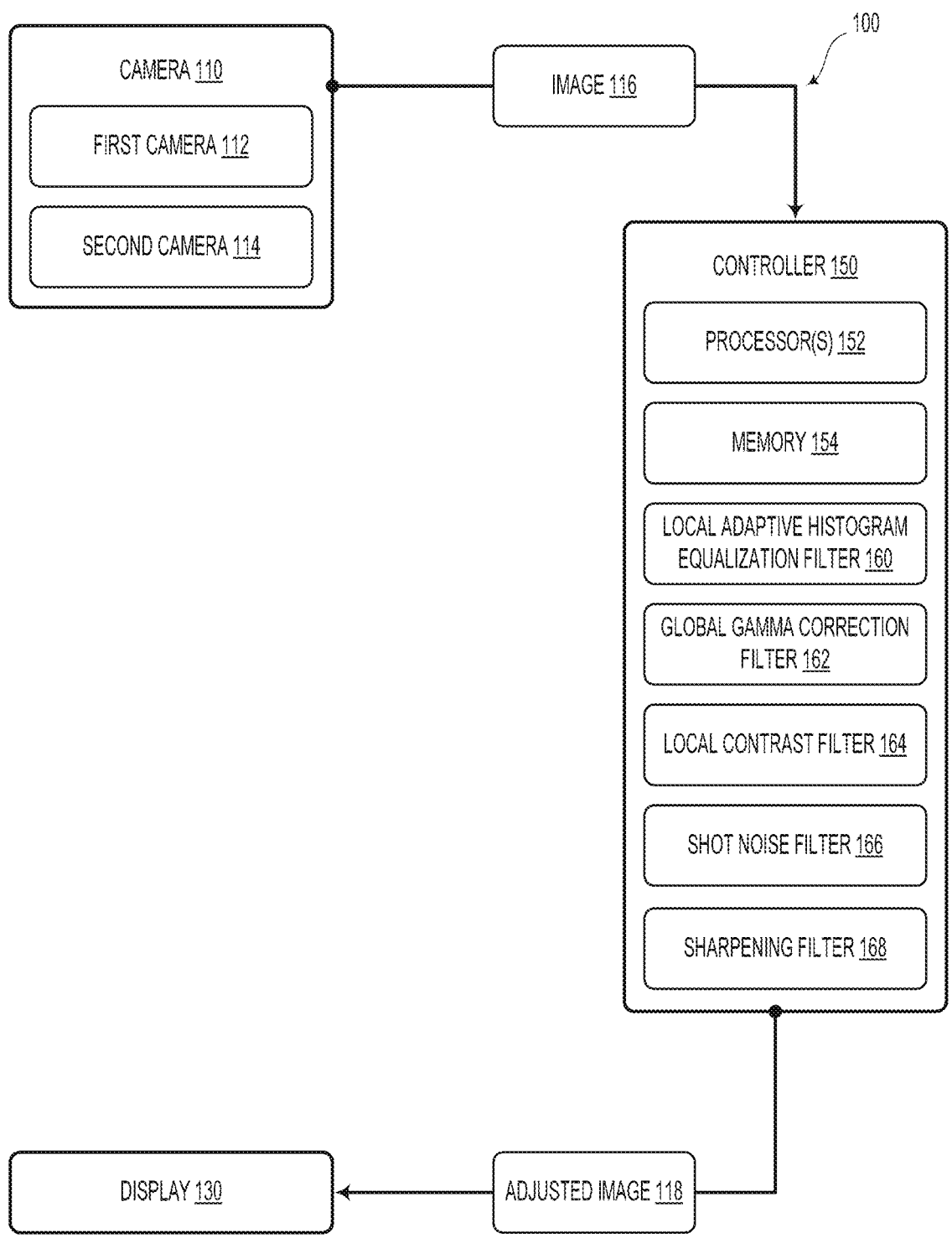
FIG. 1 illustrates an imaging system, according to an example implementation.

Example methods, devices, and systems are described herein. It should be understood that the words "example" and "exemplary" are used herein to mean "serving as an example, instance, or illustration." Any example or feature described herein as being an "example" or "exemplary" is not necessarily to be construed as preferred or advantageous over other examples or features. Other examples can be utilized, and other changes can be made, without departing from the scope of the subject matter presented herein.

Thus, the examples described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall examples, with the understanding that not all illustrated features are necessary for each example.

In the present disclosure, an improved image enhancement system and method may help the boom operator to have a better visual of the approaching airplane during refueling operations. Some embodiments described herein may include methods that combine a variety of conventional and unconventional image processing techniques. For example, some portions of the image may be adjusted according to a contrast enhancement that is specifically performed in view of improving the visibility and clarity of certain sensitive aircraft features. Such image processing systems and methods may greatly enhance image quality over a wide range of lighting conditions for both visible and long wavelength infrared (LWIR) imagery. The approach has received positive endorsements by actual AROs.

The presently described technique combines local image processing techniques and global image processing techniques to greatly improve the overall image quality. In some embodiments, the processing technique could include contrast limited adaptive histogram equalization (CLAHE) and gamma correction. CLAHE is a local image processing technique and gamma correction is a global image processing technique.

CLAHE splits an image into tiles and performs contrast limited histogram equalization on each tile. The output value for any pixel is determined by a bilinear interpolation of the contrast limited histograms of the four nearest tiles (e.g., the two nearest tiles at the image edges and just the nearest tile at the image corners). Performing contrast limited histogram equalization on relatively small image tiles adjusts the contrast enhancement to suit local scene statistics and using bilinear interpolation of the histograms has the effect of blending the tiles together seamlessly.

Gamma correction globally stretches or compresses contrast across the full data dynamic range using a power law. It can be performed either before or after CLAHE, though applying gamma correction before CLAHE tends to produce the very best results.

Additionally, shot noise filtering can be applied before or after CLAHE to reduce noise in the imagery.

Likewise, a sharpening filter can be applied before or after CLAHE to make key aircraft features more distinct. Moreover, the contrast of characteristic features like the TACAN antenna can be further enhanced before or after CLAHE using a new targeted contrast enhancement filter. The filter is a rectangular convolution kernel that is first applied horizontally, transposed, and then applied vertically. For a feature that is 3 pixels wide or tall, the convolution kernel is:

| $-1.0;$ | $-1.0;$ | $-1.0;$ | $2+2/C;$ | $2+2/C;$ | $2+2/C;$ | $-1.0;$ | $-1.0;$ | $-1.0$ |
|---|---|---|---|---|---|---|---|---|
| $-1.0;$ | $-1.0;$ | $-1.0;$ | $2+2/C;$ | $2+2/C;$ | $2+2/C;$ | $-1.0;$ | $-1.0;$ | $-1.0$ |
| $-1.0;$ | $-1.0;$ | $-1.0;$ | $2+2/C;$ | $2+2/C;$ | $2+2/C;$ | $-1.0;$ | $-1.0;$ | $-1.0$ | where C is a number ranging from 1 to 2. In many cases, C=1 works very well. This convolution kernel is normalized by multiplying it by C/18 before applying the convolution.

The present disclosure includes image processing techniques that may provide image enhancement for images of scenes that include stark contrast variations over short or long image distances. For example, the systems and methods described herein may be applied to many applications where human perception of subtle variations of image contrast is important.

II. Example Imaging Systems

FIG. 1 illustrates an imaging system 100, according to an example implementation. The imaging system 100 includes at least one camera 110. The at least one camera 110 could include a first camera 112 and a second camera 114, which could be configured to provide stereoscopic imagery. Furthermore the at least one camera 110 could be configured to provide infrared and/or visible light images. Other wavelength ranges are possible and contemplated.

The imaging system 100 also includes a display 130. The display 130 could include a video monitor or another type of display configured to provide viewable images and/or a graphical user interface.

The imaging system 100 additionally includes a controller 150. In some embodiments, the controller 150 could include at least one processor 152 and a memory 154. The at least one processor 152 may include, for instance, a microprocessor, an application-specific integrated circuit (ASIC), or a field-programmable gate array (FPGA). Other types of processors, circuits, computers, or electronic devices configured to carry out software instructions are contemplated herein. In some embodiments, the controller 150 could be configured to communicatively interact with a graphical user interface (GUI). For example, the GUI could provide a way for a user (e.g., an aerial refueling operator (ARO)) to adjust various imaging and/or display settings (e.g., contrast filter settings, brightness settings, global gamma correction settings, adaptive histogram equalization filter settings, etc.). Any or all of the operations of the controller 150 described herein could be based, at least in part, on the interactions with the GUI. The controller 150 could also include one or more hardware data interfaces, which may provide a communicative link between the controller 150 and other elements of imaging system 100. In some embodiments, the GUI could also display notifications or other types of information to the user. For example, a display of the GUI could display adjusted images and/or other information.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The at least one processor 152 of controller 150 may be configured to execute instructions stored in the memory 154 so as to carry out various operations and method steps/blocks described herein. The instructions may be stored in a permanent or transitory manner in the memory 154.

Figure 5A:
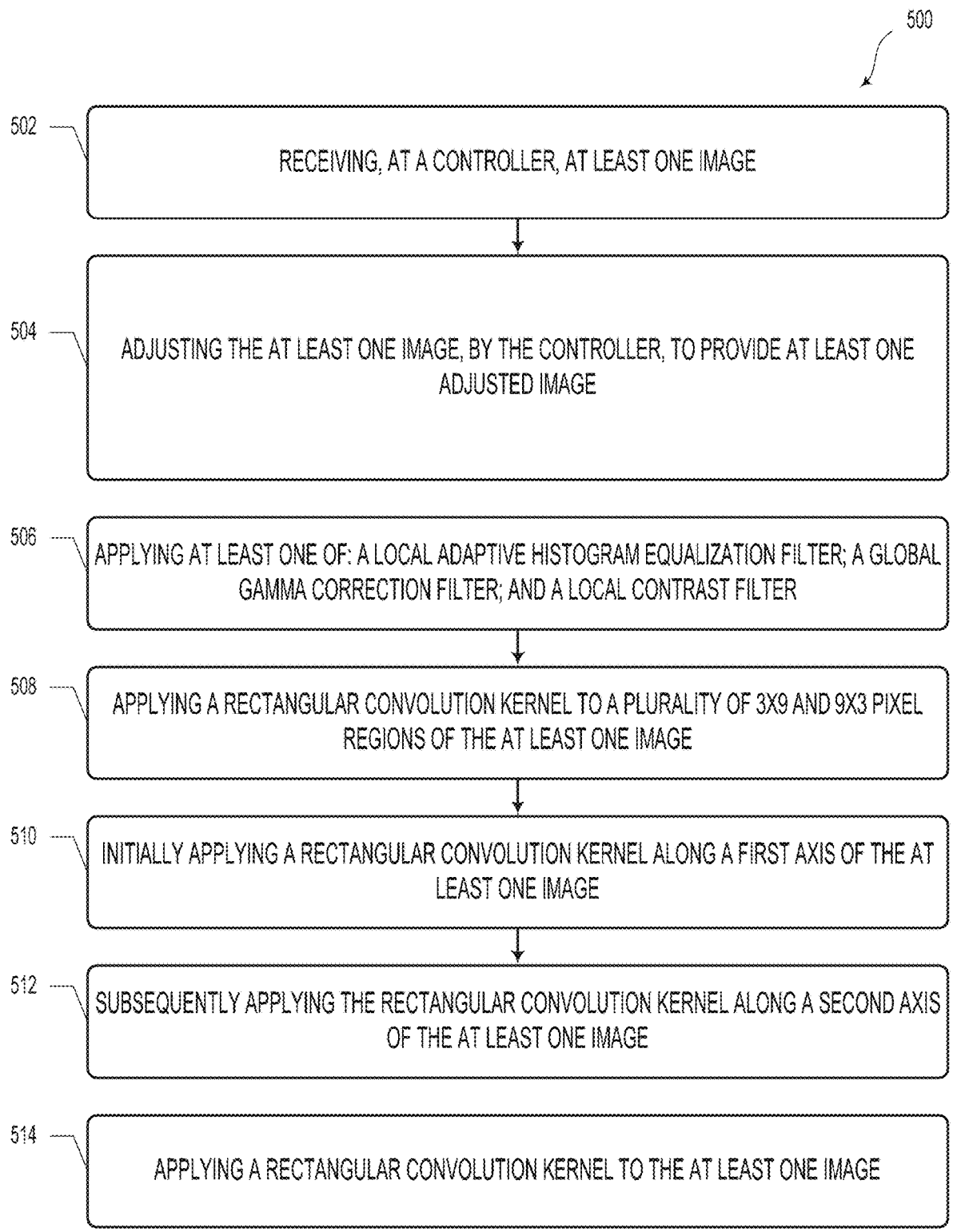
FIG. 5A illustrates a method, according to an example implementation.
Figure 5B:
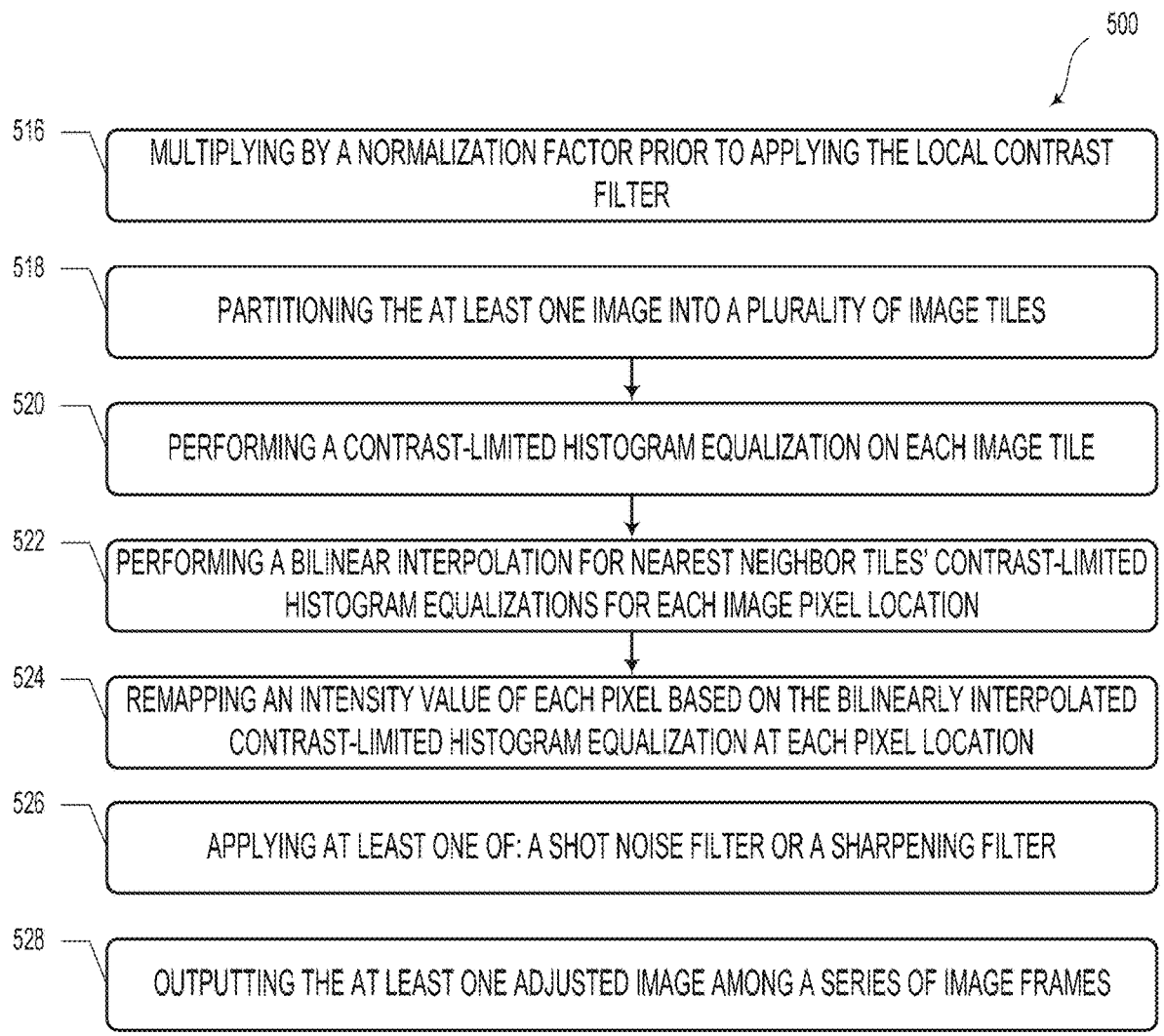
FIG. 5B illustrates a method, according to an example implementation.

As an example, the controller 150 could be configured to carry out operations such as those of method 500 as illustrated and described in relation to FIGS. 5A and 5B.

The operations include receiving at least one image 116 from the at least one camera 110. In some embodiments, the image(s) 116 could include a greyscale image or a color image of a scene.

The operations also include adjusting the at least one image 116 to provide at least one adjusted image 118. In such scenarios, adjusting the at least one image could include applying a plurality of image adjustments. For example, the image adjustments could include a local adaptive histogram equalization filter 160, a global gamma correction filter 162, and a local contrast filter 164.

The various image adjustments could be in the form of a set of instructions executable by the processor(s) 152. Additionally or alternatively, the image adjustments could be performed by a hardware filter.

The local adaptive histogram equalization filter 160 could be an image processing method or technique to improve contrast in the image 116. The local adaptive histogram equalization filter 160 may compute several histograms, each corresponding to a respective block, or local region, of the image 116. The several histograms could be utilized to redistribute the lightness values in the adjusted image 118. Furthermore, the local adaptive histogram equalization filter 160 may provide enhancements in edge definition in the adjusted image 118.

In some embodiments, the local adaptive histogram equalization filter 160 could include a Contrast Limited Adaptive Histogram Equalization (CLAHE) process or method. For example, the local adaptive histogram equalization filter 160 could have at least three parameters: block size, histogram bins, and maximum slope. The block size could define the size of the local region around a pixel for which a corresponding histogram is equalized. The block size can be selected to be similar or larger than the size of features to be preserved. The histogram bins include the number of bins utilized in the histogram equalization. The number of histogram bins can be selected to be similar or smaller than the number of pixels in a single block. The maximum slope limits the contrast "stretch" in an intensity transfer function. Large values of maximum slope will maximize local contrast while smaller values will introduce lower changes in local contrast. A maximum slope value of 1 will provide the original image.

In some embodiments, the global gamma correction filter 162 could be utilized to adjust intensity or luminance values in the adjusted image 118 as compared to the original image 116. For a given set of pixel intensity levels, the global gamma correction filter 162 could remap the intensity levels so as to conform to a power-law relationship or another type of relationship so as to provide the best viewing conditions for an ARO. In such a scenario, the intensity values of the original image 116 could be adjusted so as to substantively fit the nonlinear power law equation. For example, the luminance or intensity values could be remapped according to a linearly-increasing encoding signal in adjusted image 118. Such encoding could enhance the perception of different intensity levels within grayscale images.

The operations also include outputting the at least one adjusted image 118 to the display 130.

In some embodiments, applying the local contrast filter 164 could include applying a rectangular convolution kernel to a plurality of 3×9 and 9×3 pixel regions of the at least one image 116. For example, the local contrast filter 164 could include initially applying the rectangular convolution kernel along a first axis of the at least one image 116 and subsequently applying the rectangular convolution kernel along a second axis of the at least one image 116. As an example, the first axis and the second axis could be, but need not be, perpendicular.

As an example, the rectangular convolution kernel could be:

| -1.0 | -1.0 | -1.0 | 2 + 2/C | 2 + 2/C | 2 + 2/C | -1.0 | -1.0 | -1.0 |
| -1.0 | -1.0 | -1.0 | 2 + 2/C | 2 + 2/C | 2 + 2/C | -1.0 | -1.0 | -1.0 |
| -1.0 | -1.0 | -1.0 | 2 + 2/C | 2 + 2/C | 2 + 2/C | -1.0 | -1.0 | -1.0 | where C is a number between 1 to 2. In such scenarios, the rectangular convolution kernel could be multiplied by a normalization factor prior to applying the local contrast filter. Various normalization factors are contemplated, but one example could be where the normalization factor is a value equal to C/18. In example embodiments, the normalization factor of C/18 may be applied to maintain an overall image brightness the same before and after the application of the local contrast filter. In some embodiments, normalization factors other than C/18 may provide additional uniform brightening or dimming of the image.

In an example embodiment, applying the rectangular convolution kernel could include multiplying each pixel of the 3×9 pixel regions by the corresponding entry of the rectangular convolution kernel and taking the sum of the result of each multiplied entry. The sum could be adjusted (e.g., by multiplying the sum by the normalization factor C/18) and subsequently entered as the new intensity value of the central pixel of the 3×9 pixel region. Alternatively, the kernel itself could be multiplied by the normalization factor C/18 before application to the pixel regions.

Additionally, as described above, a 9×3 rectangular convolution kernel could be applied to a partially overlapping 9×3 pixel region of the image, which could share the same central pixel. Similarly, each pixel of the 9×3 pixel region may be multiplied by the corresponding entry of the rectangular convolution kernel. The overall sum of the multiplied entries may be adjusted (e.g., normalized) by the normalization factor and the adjusted sum may be utilized as an updated intensity value of the central pixel of the 9×3 pixel region.

In this manner, the rectangular convolution kernel(s) can be applied to each pixel of the image to provide, at least in part, the adjusted image, which may have superior image contrast properties as compared to the as-captured image.

In some embodiments, the operations may optionally include applying at least one of: a shot noise filter 166 or a sharpening filter 168.

The shot noise filter 166 could include a de-noising software or hardware filter. In some examples, the shot noise filter 166 could include a linear filter (e.g., an averaging or Gaussian filter) or non-linear de-noising filter (e.g., a median filter). Other types of shot noise or speckle noise filters are possible, including adaptive filters, such as a Wiener filter.

In some embodiments, the sharpening filter 168 could emphasize details such as edges of objects in an image. The sharpening filter 168 could include a Gaussian high pass filter and/or a Gaussian low pass filter. Unsharp filtering is also contemplated and possible within the scope of the present disclosure. In such scenarios, an unsharp mask may be subtracted away from the original image 116 to detect the presence of edges. Subsequently, contrast could be selectively increased along the detected edges, which may provide an image sharpening effect.

In an example embodiment, the sharpening filter 168 could include a 3×3 kernel. For example, the sharpening filter 168 kernel could be:

| -0.5 | -0.5 | -0.5 |
| -0.5 | 5    | -0.5 |
| -0.5 | -0.5 | -0.5 |

Alternatively, the sharpening filter 168 kernel could be:

| -9/8 | -9/8 | -9/8 |
| -9/8 | 10   | -9/8 |
| -9/8 | -9/8 | -9/8 |

It will be understood that other kernels are possible and contemplated for the sharpening filter 168.

While various operations are described herein as proceeding in a particular order, it will be understood that operations could be carried out in an alternative order. In some embodiments, the controller 150 could be configured to carry out the image adjustments in the following order: shot noise filter 166, sharpening filter 168, global gamma correction filter 162, local adaptive histogram equalization filter 160, and the local contrast filter 164. However, other orders are possible and contemplated.

Figure 2A:
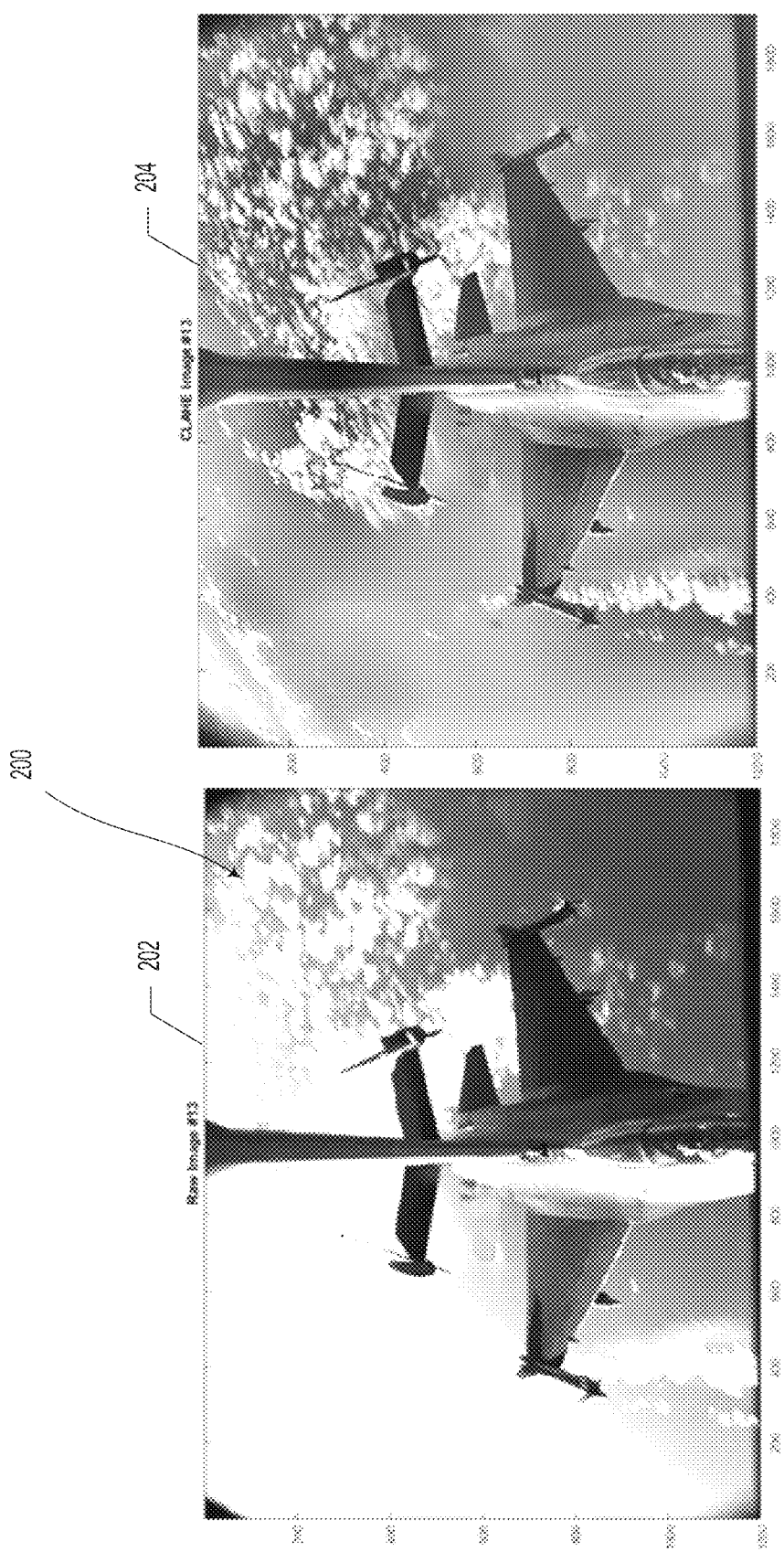
FIG. 2A illustrates an image and an adjusted image of a scene, according to an example implementation.

FIG. 2A illustrates an image 202 and an adjusted image 204 of a scene 200, according to an example implementation. The adjusted image 204 was provided based on the operations and methods described herein. As an example, the adjusted image 204 shows less glare, less noise, fewer blown highlights, and better exposure and contrast control, as compared to image 202.

Figure 2B:
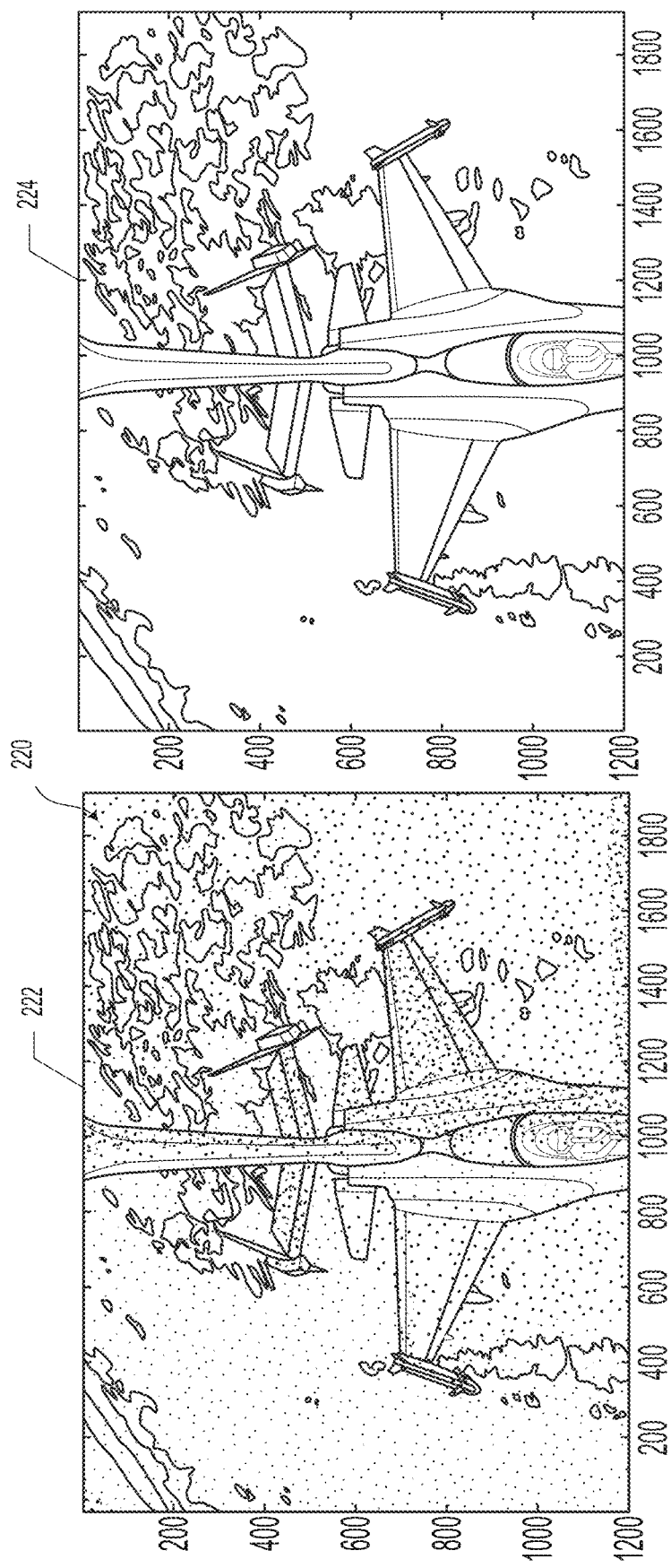
FIG. 2B illustrates an image and an adjusted image of a scene, according to an example implementation.

FIG. 2B illustrates line drawings of an image 222 and an adjusted image 224 of a scene 220, according to an example implementation. The adjusted image 224 could be provided based on carrying out the operations and/or methods described herein. As an example, the adjusted image 224 shows less noise and better object clarity, as compared to image 222.

Figure 2C:
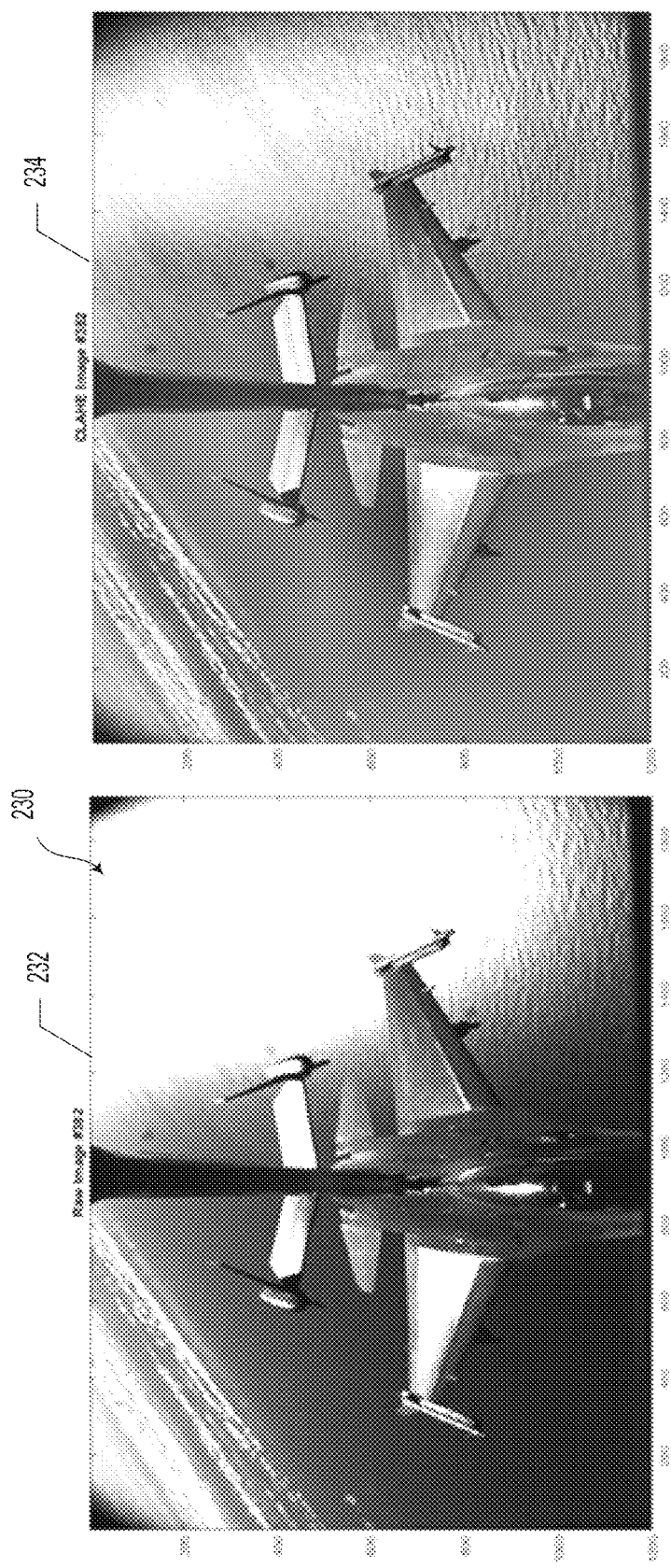
FIG. 2C illustrates an image and an adjusted image of a scene, according to an example implementation.

FIG. 2C illustrates an image 232 and an adjusted image 234 of a scene 230, according to an example implementation. The adjusted image 234 could be provided based on carrying out the operations and/or methods described herein. As an example, the adjusted image 234 shows less glare, less noise, fewer blown highlights, and better exposure and contrast control, as compared to image 232. As illustrated in FIG. 2C, the adjusted image 234 provides much better control of sunlight glare off of the wing surface of the second aircraft as well as off of the surface of the water in scene 230.

Figure 2D:
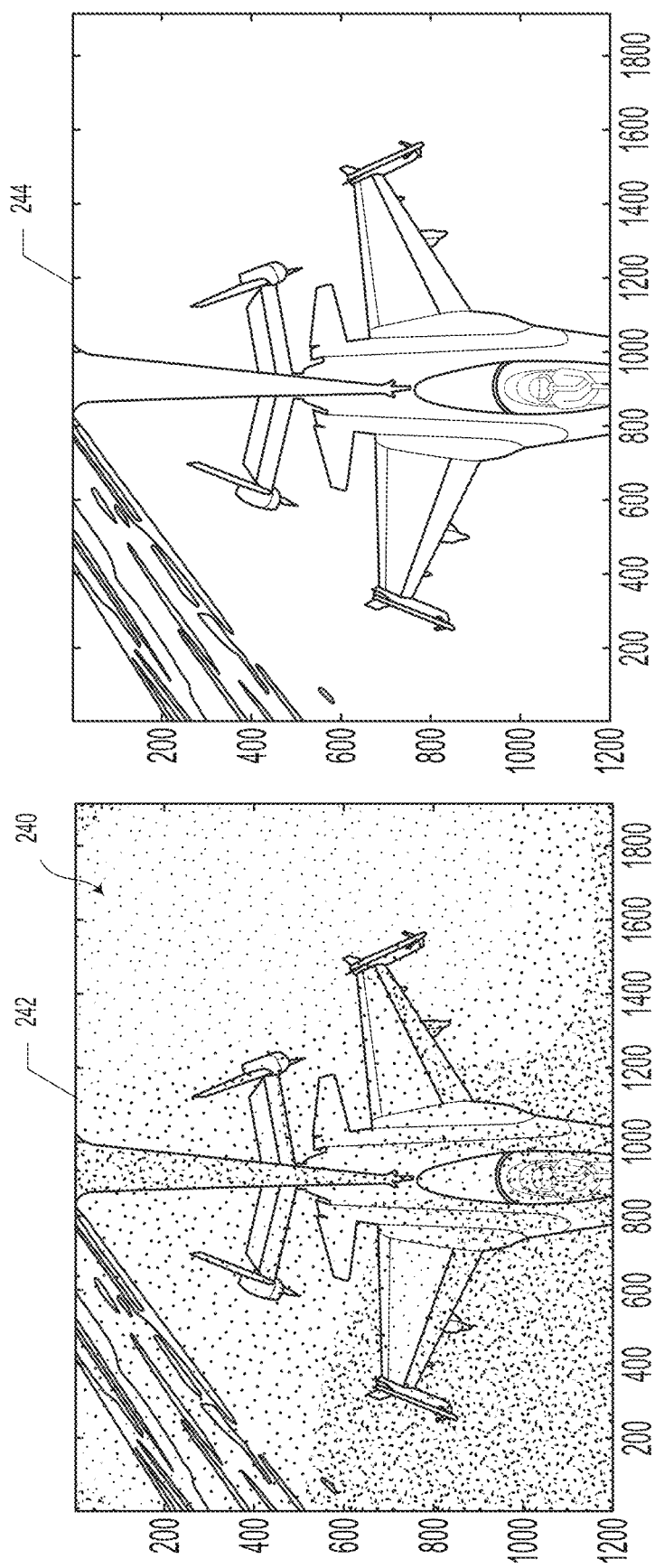
FIG. 2D illustrates an image and an adjusted image of a scene, according to an example implementation.

FIG. 2D illustrates line drawings of an image 242 and an adjusted image 244 of a scene 240, according to an example implementation. The adjusted image 244 could be provided based on carrying out the operations and/or methods described herein. As an example, the adjusted image 244 shows less noise and better object clarity, as compared to image 242.

Figure 2E:
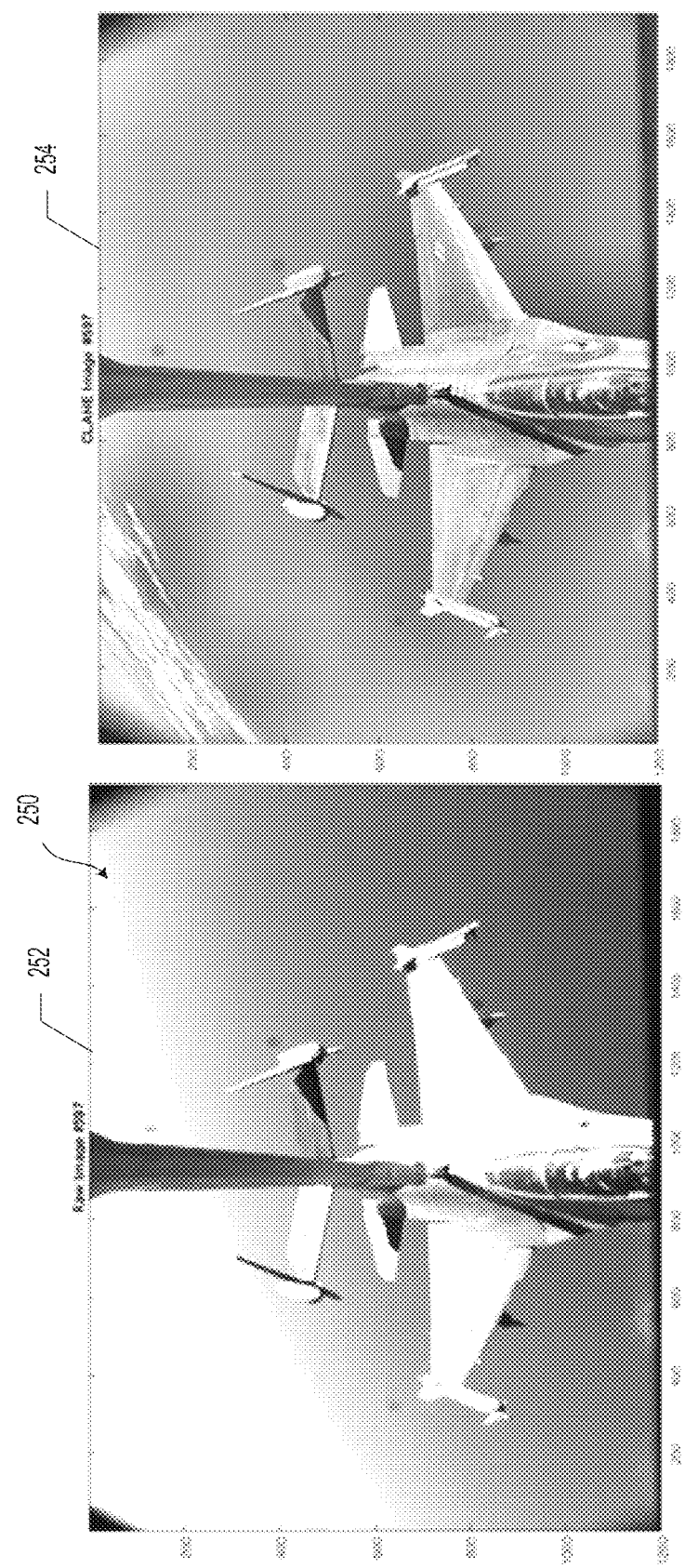
FIG. 2E illustrates an image and an adjusted image of a scene, according to an example implementation.

FIG. 2E illustrates an image 252 and an adjusted image 254 of a scene 250, according to an example implementation. The adjusted image 254 could be provided based on carrying out the operations and/or methods described herein. As an example, the adjusted image 254 shows less glare, less noise, fewer blown highlights, and better overall exposure and contrast control, as compared to image 252. As illustrated in FIG. 2E, the adjusted image 254 provides much better control of sunlight glare off of the wing surfaces of the second aircraft and enhances the characteristic features of the second aircraft.

Figure 2F:
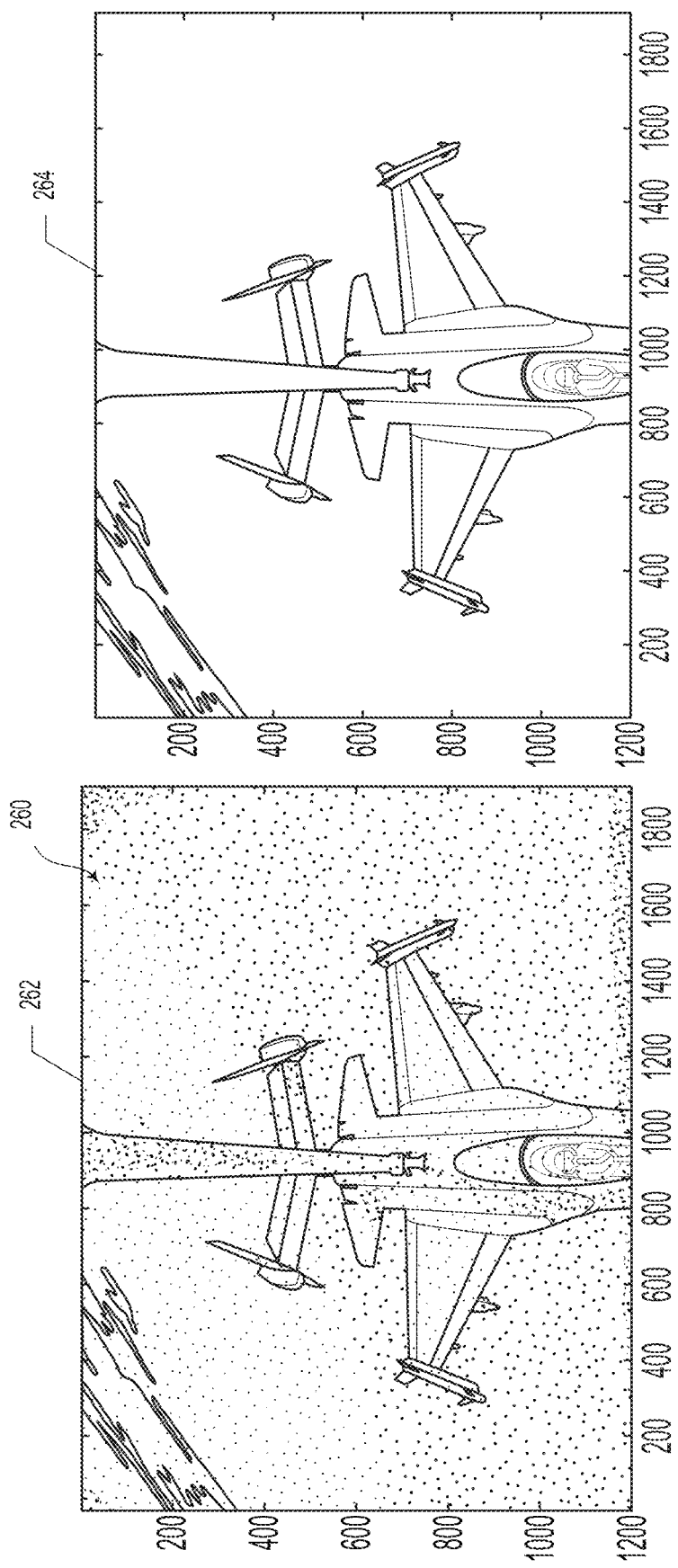
FIG. 2F illustrates an image and an adjusted image of a scene, according to an example implementation.

FIG. 2F illustrates line drawings of an image 262 and an adjusted image 264 of a scene 260, according to an example implementation. The adjusted image 264 could be provided based on carrying out the operations and/or methods described herein. As an example, the adjusted image 264 shows less noise and better object clarity, as compared to image 262.

III. Example Aerial Refueling Aircraft

Figure 3:
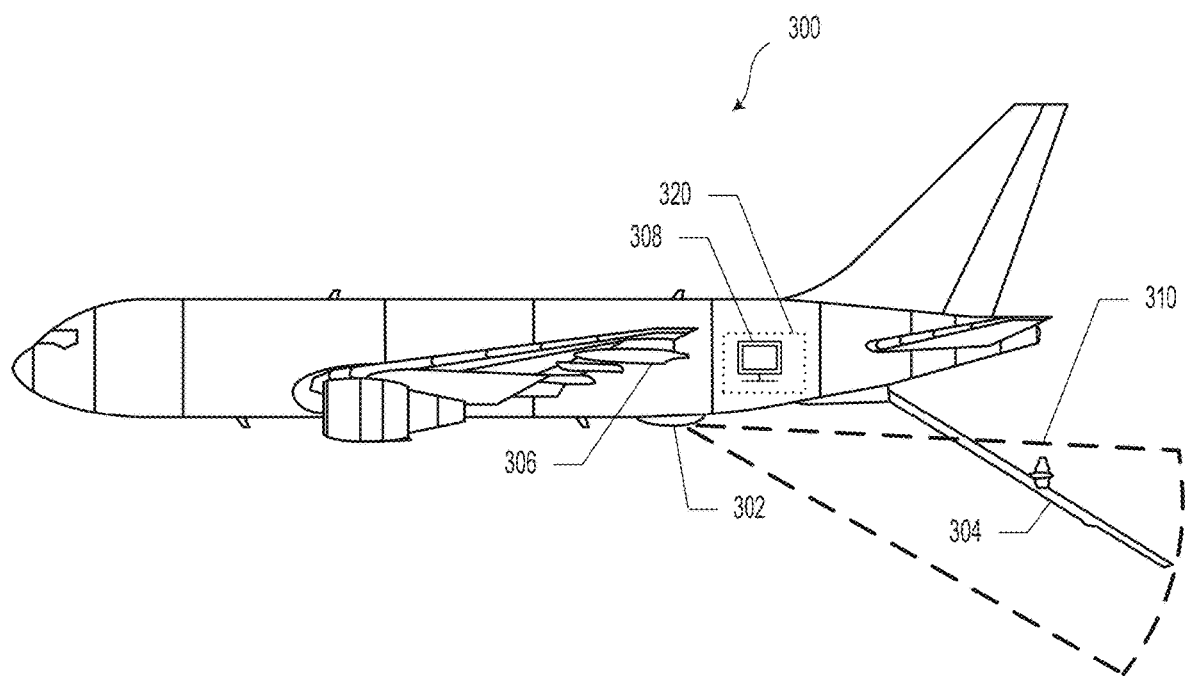
FIG. 3 illustrates aerial refueling aircraft, according to an example implementation.

FIG. 3 illustrates aerial refueling aircraft 300, according to an example implementation. The aerial refueling aircraft 300 could include jet aircraft such as a Boeing KC-46A Pegasus tanker or a variant thereof. In other embodiments, the aerial refueling aircraft 300 could include a drone tanker aircraft or another type of aerial vehicle.

Aerial refueling aircraft 300 could include elements that are similar or identical to imaging system 100. For example, aerial refueling aircraft 300 could include one or more cameras 302. Furthermore, aerial refueling aircraft 300 could include a centerline refueling boom 304 and/or one or more wingtip drogue refueling systems 306. The one or more cameras 302 may include a field of view 310 that could include a region around the centerline refueling boom 304 and/or the wingtip drogue refueling systems 306. For example, the one or more cameras 302 could be configured to provide images of an aerial refueling procedure between the aerial refueling aircraft 300 and another aircraft. The images could assist an ARO to controllably adjust a position of the centerline refueling boom 304, the wingtip drogue refueling systems 306, and/or the aerial refueling aircraft 300 with respect to the other aircraft.

In example embodiments, the aerial refueling aircraft 300 also includes a display 308. The display 308 could be a part of an aerial refueling operator (ARO) system, which may be located inside the fuselage of the aerial refueling aircraft 300.

The aerial refueling aircraft 300 includes a controller (e.g., controller 150) could be configured to provide image data to the display 308. The controller could include at least one processor and a memory. The controller may carry out certain operations. In some embodiments, the operations could include receiving at least one image (e.g., image 116) from the one or more cameras 302.

In example embodiments, the operations also include adjusting the at least one image to provide at least one adjusted image (e.g., adjusted image 118). In such scenarios, adjusting the at least one image could include applying a local adaptive histogram equalization filter (e.g., local adaptive histogram equalization filter 160). Adjusting the at least one image could also include a global gamma correction filter (e.g., global gamma correction filter 162).

In some embodiments, adjusting the at least one image could include applying a local contrast filter (e.g., local contrast filter 164). For example, applying the local contrast filter could include applying a rectangular convolution kernel to a plurality of 3×9 and 9×3 pixel regions of the at least one image. In such scenarios, applying the local contrast filter could include initially applying a rectangular convolution kernel along a first axis of the at least one image and subsequently applying the rectangular convolution kernel along a second axis of the at least one image. The first axis and the second axis could be perpendicular. However, in other embodiments, the first axis and the second axis need not be perpendicular.

As described elsewhere herein, applying the local contrast filter could include applying a rectangular convolution kernel to the at least one image. In such scenarios, the rectangular convolution kernel could be:

| −1.0 | −1.0 | −1.0 | 2 + 2/C | 2 + 2/C | 2 + 2/C | −1.0 | −1.0 | −1.0 |
|---|---|---|---|---|---|---|---|---|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0 | where C is a number between 1 to 2. Furthermore, the rectangular convolution kernel could be multiplied by a normalization factor prior to applying the local contrast filter. In some embodiments, the normalization factor could be C/18. However, other normalization factors are possible and contemplated. As described herein, normalization factors other than C/18 could be used to introduce additional uniform brightening or dimming of the image.

The operations additionally include outputting the at least one adjusted image to the display 308.

In some embodiments, the aerial refueling aircraft 300 may include an operator control interface 320. In such scenarios, the at least one camera 302 could be configured to provide the at least one image of the at least one centerline refueling boom 304 (and/or wingtip drogue refueling system 306) and a second aircraft (e.g., second aircraft 402, as described with reference to FIGS. 4A and 4B). The at least one image could be provided to an ARO by way of the display 308 of the operator control interface 320. The operator control interface 320 is configured to cause at least one movement of the at least one centerline refueling boom 304 or wingtip drogue refueling system 306 with respect to a fuel receptacle of the second aircraft. For example, an ARO may interact with the operator control interface 320 so as to adjust in-air refueling operations of the aerial refueling aircraft 300 in response to the displayed images.

Figure 4A:
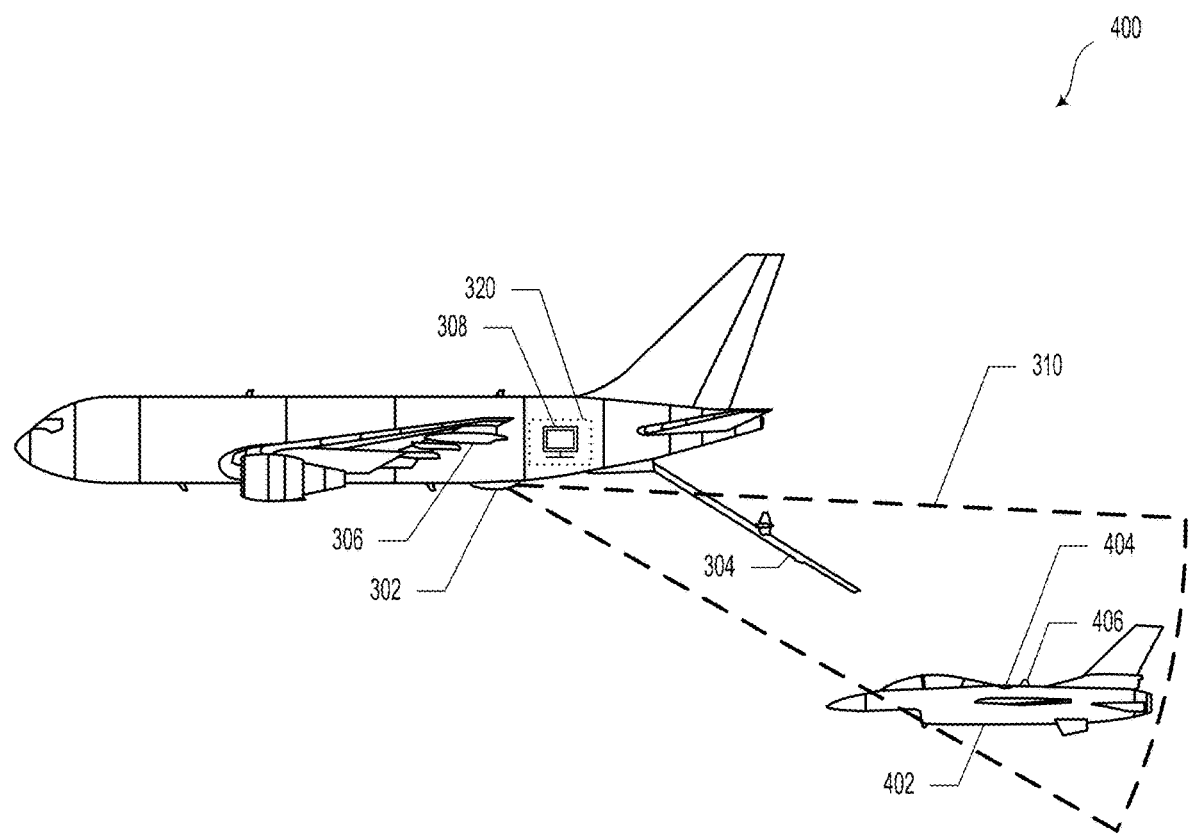
FIG. 4A illustrates an operating scenario involving the aerial refueling aircraft of FIG. 3, according to an example implementation.

FIG. 4A illustrates an operating scenario 400 involving the aerial refueling aircraft 300 of FIG. 3, according to an example implementation. Operating scenario 400 may include the aerial refueling aircraft 300 being in proximity to a second aircraft 402. In an embodiment, the second aircraft 402 could be approaching the aerial refueling aircraft 300 (e.g., so as to receive fuel). Alternatively, the second aircraft 402 could be moving away from the aerial refueling aircraft 300 (e.g., after receiving fuel). While the second aircraft 402 is illustrated in FIG. 4A as being an F-16, the second aircraft 402 could include any aerial vehicle configured to receive fuel while in flight. In such scenarios, the second aircraft 402 includes a fuel receptacle 404. Optionally, the second aircraft 402 could include characteristic features 406, such as antennas, registration markings, contours, edges, etc. that may be captured by the image 116, and which may be enhanced in the adjusted image 118. Such characteristic features 406 may aid AROs to more safely and/or more efficiently conduct in-air refueling operations.

Figure 4B:
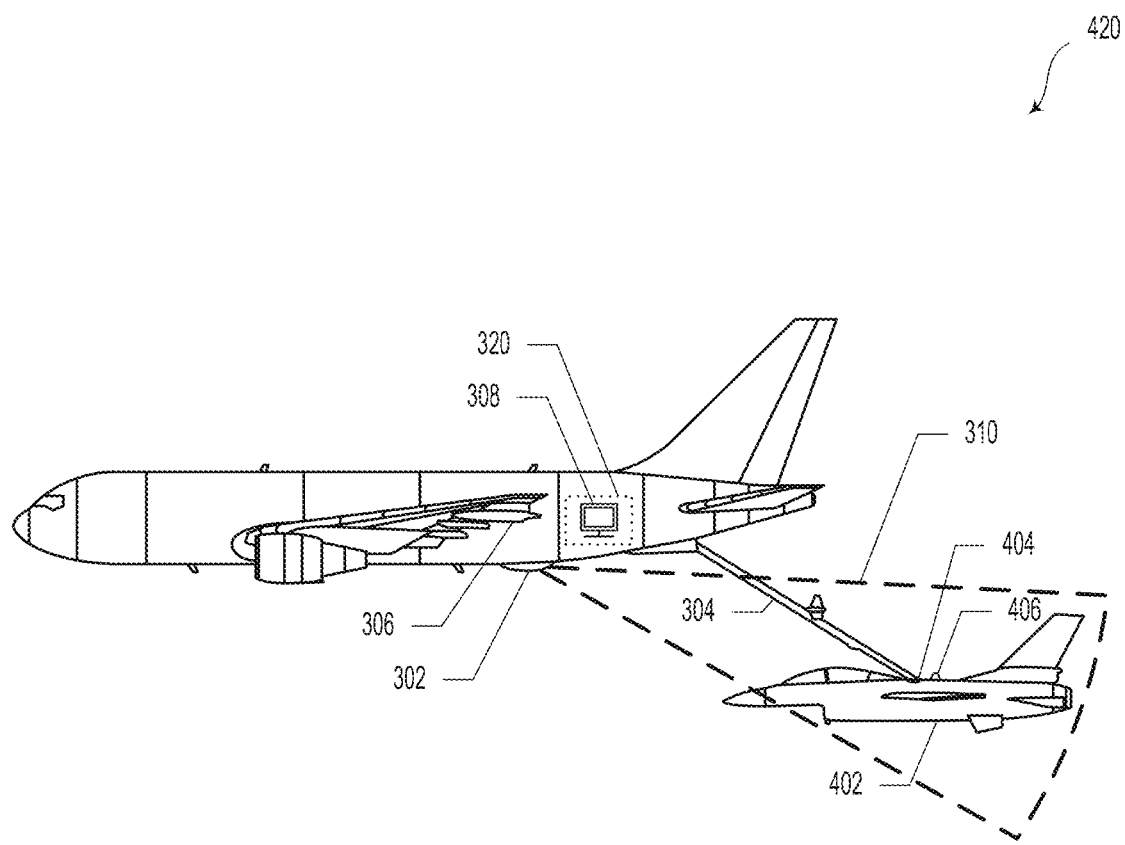
FIG. 4B illustrates an operating scenario involving the aerial refueling aircraft of FIG. 3, according to an example implementation.

FIG. 4B illustrates an operating scenario 420 involving the aerial refueling aircraft 300 of FIG. 3, according to an example implementation. As illustrated in FIG. 4B, the second aircraft 402 may be physically coupled to the centerline refueling boom 304 so as to receive fuel from the aerial refueling aircraft 300 via the fuel receptacle 404. While being physically coupled to the centerline refueling boom 304, the ARO may observe the second aircraft 402 and its characteristic features 406 on the display 308 so as to maintain proper relative spacing and/or relative position between the aerial refueling aircraft 300, the centerline refueling boom 304, and the second aircraft 402.

IV. Example Methods

FIGS. 5A and 5B illustrate a method 500, according to an example implementation. Method 500 may involve elements of imaging system 100 and/or aerial refueling aircraft 300 as illustrated and described in reference to FIG. 1 and FIG. 3, respectively. Additionally or alternatively, some or all elements of method 500 may relate to operating scenarios 400 and 420 as illustrated in FIGS. 4A and 4B. While FIGS. 5A and 5B illustrate certain blocks or steps of method 500 as following a specific order, it will be understood that some blocks or steps of method 500 could be omitted and/or other blocks or steps could be included. Furthermore, the blocks or steps of method 500 could be carried out in a different order, in parallel (e.g., concurrently), and/or repeated. In some embodiments, at least some blocks of method 500 could be carried out, at least in part, by controller 150, as illustrated and described in reference to FIG. 1.

Method 500 could provide a method to process video and/or still images.

Block 502 could include receiving, at a controller (e.g., controller 150), at least one image (e.g., image 116). In some embodiments, the at least one image could include a plurality of images from one or more cameras.

In some embodiments, at least one image could include an image pair. In such scenarios, the image pair includes a first image captured by a first camera (e.g., first camera 112) and a second image captured by a second camera (e.g., second camera 114). As an example, the first camera and the second camera could be configured to provide stereoscopic imagery.

In some embodiments, such stereoscopic imagery may provide an apparent three-dimensional view of the scene.

Block 504 includes adjusting the at least one image, by the controller, to provide at least one adjusted image (e.g., adjusted image 118). Adjusting the at least one image includes applying 506: a local adaptive histogram equalization filter (e.g., local adaptive histogram equalization filter 160), a global gamma correction filter (e.g., global gamma correction filter 162), and a local contrast filter (e.g., local contrast filter 164).

In some embodiments, applying the local contrast filter could include applying 508 a rectangular convolution kernel to a plurality of 3×9 and 9×3 pixel regions of the at least one image.

Additionally or alternatively, applying the local contrast filter could include initially applying 510 a rectangular convolution kernel along a first axis of the at least one image and subsequently applying 512 the rectangular convolution kernel along a second axis of the at least one image. For example, the first axis and the second axis could be perpendicular.

In such scenarios, applying the local contrast filter could include applying 514 a rectangular convolution kernel to the at least one image. The rectangular convolution kernel could be:

| −1.0 | −1.0 | −1.0 | 2 + 2/C | 2 + 2/C | 2 + 2/C | −1.0 | −1.0 | −1.0 |
|---|---|---|---|---|---|---|---|---|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0 |

C could be a value between 1 to 2. In such scenarios, the rectangular convolution kernel may be multiplied 516 by a normalization factor prior to applying the local contrast filter. In some embodiments, the normalization factor is C/18. However, the normalization factor could be a different value.

In various embodiments, applying the local adaptive histogram equalization filter may include partitioning 518 the at least one image into a plurality of image tiles, performing 520 a contrast-limited histogram equalization on each image tile, performing 522 a bilinear interpolation for nearest neighbor tiles' contrast-limited histogram equalizations for each image pixel location, and remapping 524 an intensity value of each pixel based on the bilinearly interpolated contrast-limited histogram equalization at each pixel location.

In some embodiments, adjusting the at least one image could include applying 526 at least one of: a shot noise filter (e.g., shot noise filter 166) or a sharpening filter (e.g., sharpening filter 168).

In some embodiments, method 500 could include outputting 528 the at least one adjusted image among a series of image frames. In such scenarios, the series of image frames could be output at a frame rate of at least 59.94 frames per second or at another frame rate suitable for high-definition video.

Figure 6:
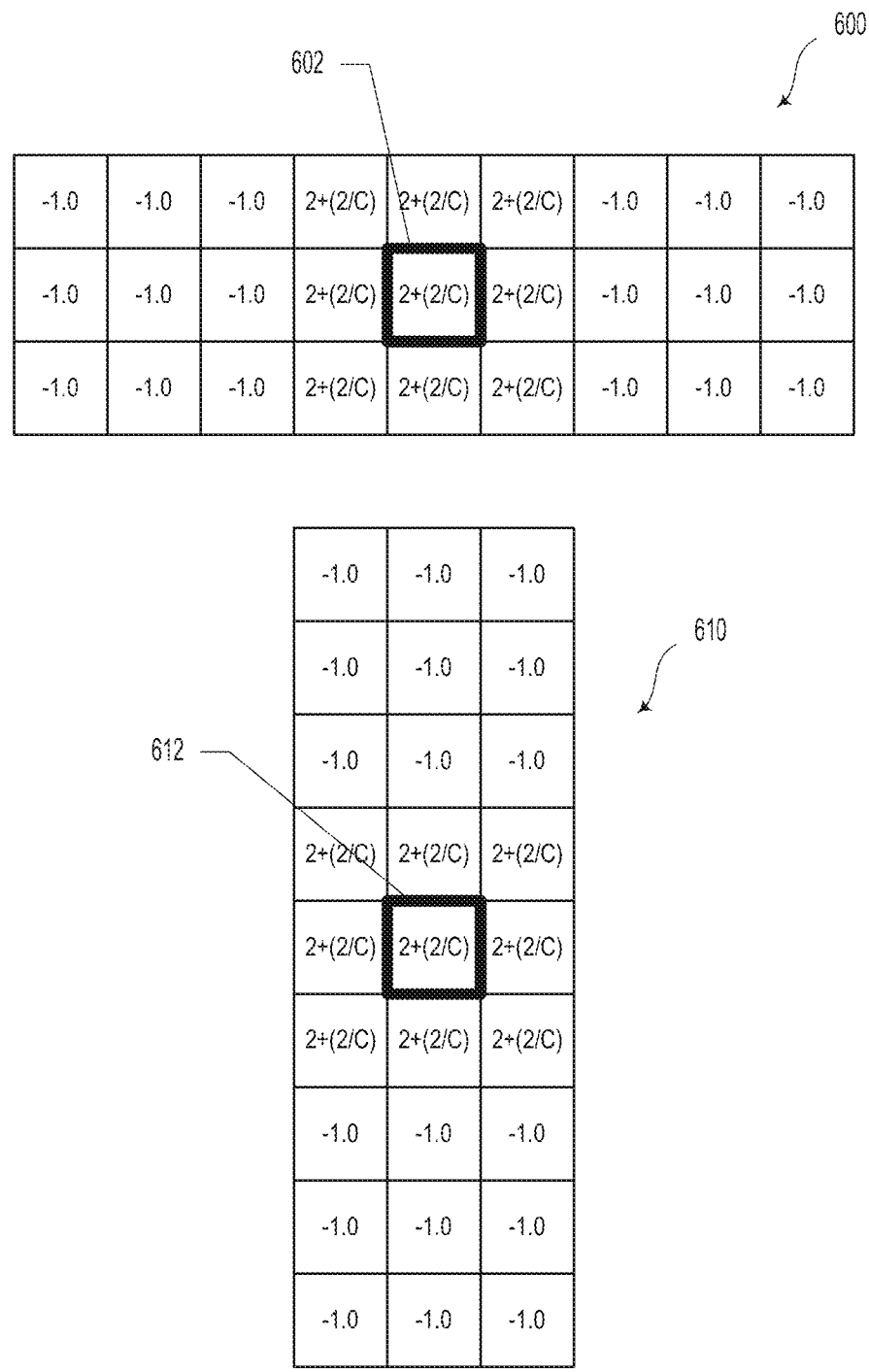
FIG. 6 illustrates unnormalized rectangular convolution kernels, according to an example implementation.

FIG. 6 illustrates unnormalized rectangular convolution kernels 600 and 610 of a local image contrast filter (e.g., local contrast filter 164), according to an example implementation. As illustrated, rectangular convolution kernel 600 could include a 3 row, 9 column convolution matrix that could be applied to a corresponding 3×9 pixel region in an image.

Correspondingly, the rectangular convolution kernel 610 could include a 9 row, 3 column convolution matrix that could be applied to a corresponding 9×3 pixel region in an image.

In some embodiments, rectangular convolution kernel 600 could be initially applied to a given 3×9 pixel region of the image. Subsequently, rectangular convolution kernel 610 could be applied to a 9×3 pixel region of the image that at least partially overlaps the initial 3×9 pixel region. The order of application of the rectangular convolution kernels 600 and 610 could be reversed or may vary. Furthermore, while 3×9 and 9×3 rectangular convolution kernels are illustrated, it will be understood that rectangular convolution kernels with different dimensions (e.g., 1×3, 5×15, 7×21, etc.) are possible and contemplated.

In an example embodiment, applying the rectangular convolution kernel 600 could include multiplying an intensity value of each pixel of the 3×9 pixel region by the corresponding entry of the rectangular convolution kernel 600 and taking the sum of the result of each multiplied entry. The sum could be adjusted (e.g., by multiplying the sum by the normalization factor C/18) and subsequently entered as the adjusted intensity value of the central pixel (e.g., the pixel corresponding with kernel entry 602) of the 3×9 pixel region.

Additionally, as described above, a 9×3 rectangular convolution kernel could be applied to a partially overlapping 9×3 pixel region of the image, which could share the same central pixel (e.g., the pixel corresponding to kernel entry 612). Similarly, an intensity value of each pixel of the 9×3 pixel region may be multiplied by the corresponding entry of the rectangular convolution kernel. The overall sum of the multiplied entries may be adjusted (e.g., normalized) by the normalization factor and the adjusted sum may be utilized as an adjusted intensity value of the central pixel of the 9×3 pixel region.

In this manner, the rectangular convolution kernel(s) can be applied to each pixel of the image to provide, at least in part, the adjusted image, which may have improved image contrast properties as compared to the as-captured image. In some embodiments, the rectangular convolution kernel(s) may be applied to a portion of the image based on an intensity of the central pixel, for example, being above or below a predetermined pixel intensity threshold. As an example, the local contrast filter could be selectively applied to dark or bright portions of the image. For example, the local contrast filter could be applied when a given pixel intensity value is less than 10% of the maximum intensity value and/or greater than 90% of the maximum intensity value. Other threshold intensity values are possible and contemplated.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method (500) for processing images comprising:
   receiving (502), at a controller (150), at least one image (116); and
   adjusting (504) the at least one image (116), by the controller (150), to provide at least one adjusted image (118), wherein adjusting the at least one image (116) comprises applying (506):
   a local adaptive histogram equalization filter (160);
   a global gamma correction filter (162); and
   a local contrast filter (164), and
   wherein applying the local contrast filter (164) comprises applying (508) a rectangular convolution kernel (600, 610) to a plurality of 3×9 and 9×3 pixel regions of the at least one image (116).

2. The method (500) of claim 1, wherein applying the local contrast filter (164) further comprises initially applying (510) the rectangular convolution kernel (600) along a first axis of the at least one image (116) and subsequently applying (512) the rectangular convolution kernel (610) along a second axis of the at least one image (116), wherein the first axis and the second axis are perpendicular.

3. The method (500) of claim 1, wherein applying the local contrast filter (164) further comprises applying (514) the rectangular convolution kernel (600) to the at least one image (116), wherein the rectangular convolution kernel (600) is:

| −1.0 | −1.0 | −1.0 | 2 + 2/C | 2 + 2/C | 2 + 2/C | −1.0 | −1.0 | −1.0 |
|------|------|------|---------|---------|---------|------|------|------|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0 | wherein C is a number between 1 to 2.

4. The method (500) of claim 3, wherein applying the rectangular convolution kernel (600, 610) further comprises multiplying (516) by a normalization factor prior to applying the local contrast filter (164), and wherein the normalization factor is C/18.

5. The method (500) of claim 1, wherein applying the local adaptive histogram equalization filter (160) comprises:
   partitioning (518) the at least one image (116) into a plurality of image tiles;
   performing (520) a contrast-limited histogram equalization on each image tile;
   performing (522) a bilinear interpolation for nearest neighbor tiles' contrast-limited histogram equalizations for each image pixel location; and
   remapping (524) an intensity value of each pixel based on the bilinearly interpolated contrast-limited histogram equalization at each pixel location.

6. The method (500) of claim 1, wherein adjusting the at least one image (116) further comprises applying (526) at least one of:
   a shot noise filter (166); or
   a sharpening filter (168).

7. The method (500) of claim 1, further comprising:
   outputting (528) the at least one adjusted image (118) among a series of image frames, wherein the series of image frames are output at a frame rate of at least 59.94 frames per second.

8. The method (500) of claim 1, wherein the at least one image (116) comprises an image pair, wherein the image pair comprises:
   a first image captured by a first camera (112); and
   a second image captured by a second camera (114), wherein the first camera (112) and the second camera (114) are configured to provide stereoscopic imagery.

9. The method (500) of claim 1, further comprising:
   outputting (528) the at least one adjusted image (118) among a series of image frames, wherein the series of image frames are output at a frame rate associated with high-definition video.

10. An imaging system (100), comprising:
    at least one camera (110);
    a display (130);
    a controller (150), wherein the controller (150) comprises at least one processor (152) and a memory (154), wherein the controller (150) carries out operations, wherein the operations comprise:
      receiving (502) at least one image (116) from the at least one camera (110);
      adjusting (504) the at least one image (116) to provide at least one adjusted image (118), wherein adjusting the at least one image (116) comprises applying (506):
        a local adaptive histogram equalization filter (160);
        a global gamma correction filter (162); and
        a local contrast filter (164); and
      outputting (528) the at least one adjusted image (118) to the display (130),
    wherein applying the local contrast filter (164) comprises applying (508) a rectangular convolution kernel (600, 610) to a plurality of 3×9 and 9×3 pixel regions of the at least one image (116).

11. The imaging system (100) of claim 10, wherein applying the local contrast filter (164) further comprises initially applying (510) the rectangular convolution kernel (600) along a first axis of the at least one image (116) and subsequently applying (512) the rectangular convolution kernel (610) along a second axis of the at least one image (116), wherein the first axis and the second axis are perpendicular.

12. The imaging system (100) of claim 10, wherein applying the local contrast filter (164) further comprises applying (514) the rectangular convolution kernel (600) to the at least one image (116), wherein the rectangular convolution kernel (600) is:

| −1.0 | −1.0 | −1.0 | 2 + 2/C | 2 + 2/C | 2 + 2/C | −1.0 | −1.0 | −1.0 |
|---|---|---|---|---|---|---|---|---|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0 | wherein C in a number between 1 to 2.

13. The imaging system (100) of claim 12, wherein applying the rectangular convolution kernel (600, 610) further comprises multiplying (516) by a normalization factor prior to applying the local contrast filter (164), and wherein the normalization factor is C/18.

14. The imaging system (100) of claim 10, wherein adjusting the at least one image (116) further comprises applying (526) at least one of:
    a shot noise filter (166); or
    a sharpening filter (168).

15. An aerial refueling aircraft (300), comprising:
    a display (130);
    a controller (150) configured to provide image data to the display (130), wherein the controller (150) comprises at least one processor (152) and a memory (154), wherein the controller (150) carries out operations, wherein the operations comprise:
      receiving (502) at least one image (116);
      adjusting (504) the at least one image (116) to provide at least one adjusted image (118), wherein adjusting the at least one image (116) comprises applying (506):
        a local adaptive histogram equalization filter (160);
        a global gamma correction filter (162); and
        a local contrast filter (164); and
      outputting (528) the at least one adjusted image (118) to the display (130),
    wherein applying the local contrast filter (164) comprises applying (508) a rectangular convolution kernel (600, 610) to a plurality of 3×9 and 9×3 pixel regions of the at least one image (116).

16. The aerial refueling aircraft (300) of claim 15, wherein applying the local contrast filter (164) further comprises initially applying (510) the rectangular convolution kernel (600) along a first axis of the at least one image (116) and subsequently applying (512) the rectangular convolution kernel (610) along a second axis of the at least one image (116), wherein the first axis and the second axis are perpendicular.

17. The aerial refueling aircraft (300) of claim 15, wherein applying the local contrast filter (164) further comprises applying (514) the rectangular convolution kernel (600) to the at least one image (116), wherein the rectangular convolution kernel (600) is:

| −1.0 | −1.0 | −1.0 | 2 + 2/C | 2 + 2/C | 2 + 2/C | −1.0 | −1.0 | −1.0 |
|---|---|---|---|---|---|---|---|---|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0 | wherein C is a number between 1 to 2.

18. The aerial refueling aircraft (300) of claim 17, wherein applying the rectangular convolution kernel (600, 610) further comprises multiplying (516) by a normalization factor prior to applying the local contrast filter (164), and wherein the normalization factor is C/18.

19. The aerial refueling aircraft (300) of claim 15, further comprising:
  at least one refueling boom (304);
  at least one camera (110);
  and an operator control interface (320), wherein the at least one camera (110) is configured to provide the at least one image (116) of the at least one refueling boom (304) and a second aircraft (402), wherein the operator control interface (320) is configured to cause at least one movement of the at least one refueling boom (304) with respect to a fuel receptacle (404) of the second aircraft (402).

20. The aerial refueling aircraft (300) of claim 15, wherein adjusting the at least one image (116) further comprises applying (526) at least one of:
  a shot noise filter (166); or
  a sharpening filter (168).

* * * * *